H. T. HAZARD.
BUMPER.
APPLICATION FILED SEPT. 26, 1916.
1,272,256.
Patented July 9, 1918.
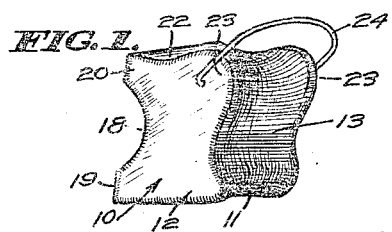
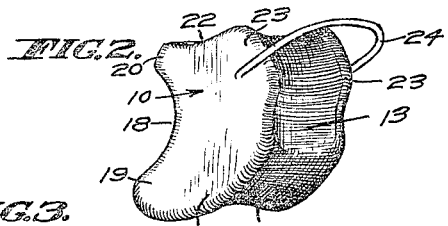
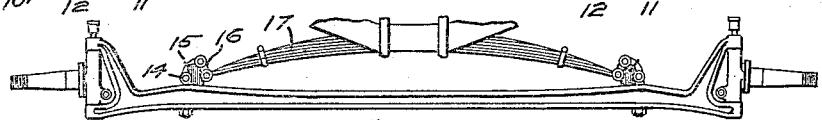
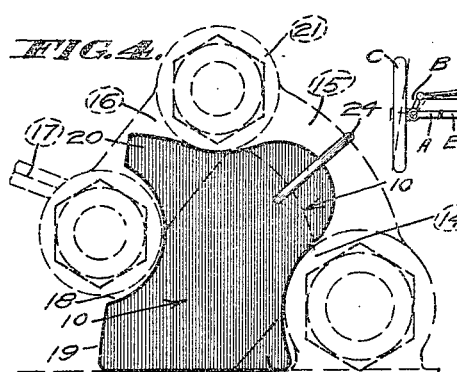
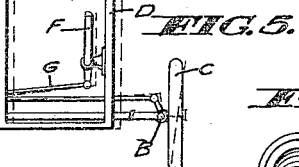
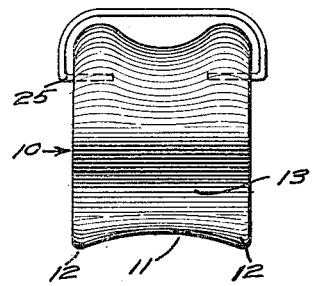
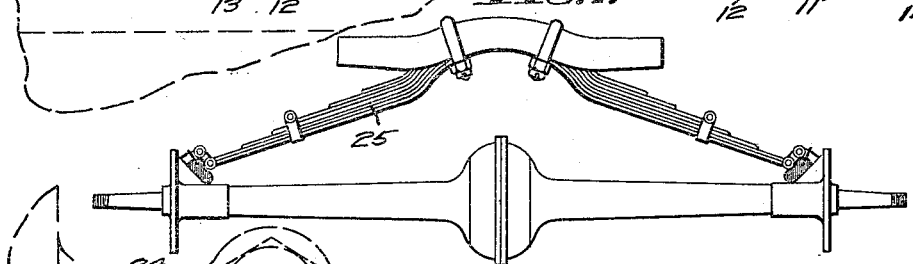
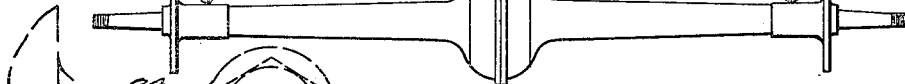
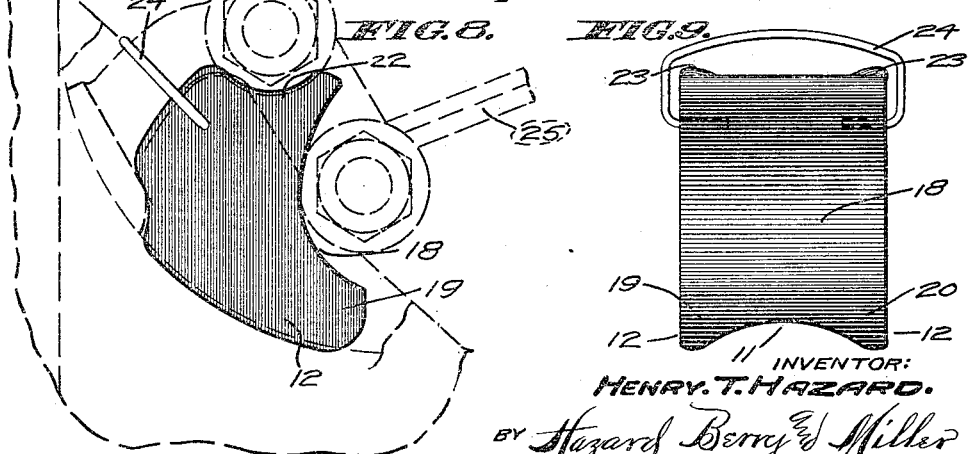
INVENTOR:
HENRY. T. HAZARD.
BY Hazard, Berry & Miller
ATTORNEYS.

UNITED STATES PATENT OFFICE.

HENRY T. HAZARD, OF LOS ANGELES, CALIFORNIA.

BUMPER.

1,272,256.    Specification of Letters Patent.    Patented July 9, 1918.

Application filed September 26, 1916. Serial No. 122,207.

*To all whom it may concern:*

Be it known that I, HENRY T. HAZARD, a citizen of the United States, residing at Los Angeles, in the county of Los Angeles and State of California, have invented new and useful Improvements in Bumpers, of which the following is a specification.

This invention relates to a bumper and particularly pertains to bumpers used in conjunction with link suspended semi-elliptic vehicle springs.

In the design and construction of auto vehicles it is common practice to interpose semi-elliptic springs between the vehicle body and axles, which springs are rigidly mounted to the body at their centers and have their outer ends carried by dependent links mounted to swing from brackets on the axles; the links serving to permit free elongation of the springs on depression thereof. This link projection has proven objectionable, particularly where employed on automobiles, where the springs extend transversely of the vehicle body and where a steering arm, on a steering shaft, carried by the vehicle body, is connected to the steering knuckle of the front wheels; the objection being that when the vehicle is traveling at high speed, traversing rough or laterally inclined surfaces, or making turns, a transverse swaying or rocking movement of the vehicle body is effected, which movement acts through the connections of the steering mechanism above referred to, leading from the vehicle body to the front wheels, and will cause the wheels to wabble from side to side. This interferes with the proper steering of the vehicle and renders the steering defective, sometimes causes the loss of control of the movements of the vehicle, often resulting in disaster, and in any event, necessitates considerable reduction of speed in order to avoid accident.

It is the object of this invention to provide a bumper which will yieldably permit elongation of link suspended springs, and at the same time prevent the objectionable and dangerous swaying movement of the vehicle body, due to excessive oscillation of the links, by taking up lost motion of the latter.

A further object is to provide a bumper of the above character, which is so constructed that it may be readily placed and securely held in position by being so shaped as to conform to the surfaces between which it is interposed.

In carrying out the present invention, I provide a resilient body formed of rubber or suitable composition, adapted to be interposed between the dependent links, the bracket on which they are carried, the axle, and the rounded return end of the springs, and so shaped as to substantially fill the space between these parts.

The invention is illustrated in the accompanying drawings in which:

Figure 1 is a view in perspective illustrating the bumper as adapted for placement on the front axle.

Fig. 2 is a similar view showing the bumper as adapted to be applied to the rear axle.

Fig. 3 is a view illustrating the application of the bumper shown in Fig. 1 to the front axle and spring of an automobile.

Fig. 4 is a detail illustrating the forward bumper in side elevation and indicating the manner of mounting same.

Fig. 5 is a diagram illustrating the manner in which the front wheels of an automobile are caused to wabble by lateral swinging movement of the body.

Fig. 6 is a view of the forward bumper in front elevation.

Fig. 7 is a view illustrating the application of the bumper to the rear axle and springs of an automobile.

Fig. 8 is a detail of the rear bumper showing the rear bumper in side elevation and illustrating the manner of mounting same.

Fig. 9 is a view of the rear bumper in end elevation.

In equipping an automobile with bumpers of the type constituting the present invention, it is necessary to provide two styles of a bumper in order to adapt it to the slightly different forms of connection between the ends of the front and rear springs and their respective axles; the bumpers, however, only differing from each other in minor details, but corresponding in their general shape and essential features. The forward bumper shown in Fig. 1 comprises a body portion 10, having parallel sides and a substantially straight lower face, the latter face being concave transversely of the body so as to conform to the convex upper face of the axle, forming a saddle 11 on the under side of the body, as shown in Fig. 6. This saddle, projecting downward at its edges, forms longitudinally extending bottom flanges 12 on opposite sides of the body which serve to inhibit sidewise shifting of the bumper when seated and held in place on the axle. The rear face of the body member 10 is formed with a transversely extending concave face 13 to conform to a correspondingly curved face on a boss 14, formed on the axle, and on which an inwardly curved bracket 15 is carried. The upper end of the bracket 15 is disposed between a pair of dependent links 16 which are pivoted to the bracket and have the lower ends pivotally secured to the round terminals of the front spring 17, as shown in Fig. 3; the links 16 being normally positioned at an inclination to the bracket 15, as shown in Fig. 4.

The front face of the body member 10 is formed with a transverse arcuate channel 18 adapted to receive the rounded terminal of the spring; the forward face of the bumper body 10 being thus formed with a pair of forked members 19 and 20, with the member 19 adapted to be interposed between the rounded terminal and the axle, and the member 20 adapted to extend over the rounded terminal and between the links 16. The upper face of the body member 10 is designed to bear against the under side of the cylindrical lug 21 formed on the upper end of the bracket 15, and this face is preferably formed with a transversely extending depression 22 to receive the rounded lower portion of the lug 21. The portion of the body member extending between the depression 22 and the transverse concave face 13 is dished to receive the under side of the bracket 15 and to form a pair of ears 23, which are adapted to project on the opposite sides of the bracket 15, and coöperate with the flanges 12 in holding the bumper against lateral displacement; the links 16 in extending on opposite sides of the member 20, further serving to hold the bumper against sidewise movement. As a further means of holding the bumper in place and particularly for preventing dislodgment of the bumper in the event the links 16 are moved upwardly sufficiently far to permit the bumper being displaced, a U-shaped spring wire 24 having in-turned ends 25 is provided; the wire being adapted to be placed astride of the bracket 15 and disposed with its ends embedded in the sides of the bumper, as particularly shown in Fig. 6. The wire 24 is so tensioned that its ends will pierce and securely engage the bumper but may be spread apart and disengaged from the bumper when it is desired to remove the latter.

The rear bumper shown in Fig. 2 corresponds in form to that previously described in reference to the forward bumper shown in Fig. 1, with exception that the lower face of the bumper is curved longitudinally to conform to the usual flare formed on the rear axle at the base of the link supporting bracket. The body portion of the rear bumper is thus formed with the saddle 11, flanges 12, concave face 13, transverse channel 18, fork members 19 and 20, depression 22, ears 23, and the bail 24, substantially the same as the corresponding parts of the forward bumper.

In the application of the invention, a forward bumper is disposed at each end of the front spring 17, and a rear bumper is disposed at each end of a rear spring 25; the bumpers being interposed in the space between the axles, brackets, depending links, and rounded terminals of the springs, as particularly shown in Figs. 4 and 8.

The bumpers are of sufficient rigidity to act when disposed at each end of the springs to prevent free swinging movement of the links, thereby limiting the lateral swinging movement of the vehicle body in relation to the axles, and as a consequence, obviating the wabbling of the front wheels, ordinarily occasioned by swaying movement of the body. The bumpers, however, are of sufficient resiliency to permit their being compressed on depression of the springs to allow elongation of the latter, and not interfere with their shock-absorbing function.

The manner in which the side swaying of the body acts to wabble the steering wheels is illustrated in Fig. 5, in which A indicates the front axle, B the steering knuckles thereon, C the front wheels, D the frame, E the front springs, F the steering column, and G the drag link connecting the column and steering knuckles. The sidewise movement of the frame in relation to the axle exerts either a thrust or a pull on the drag link, which operates to rock the steering knuckles, thus setting up a wabbling movement of the front wheels. These movements are indicated by the dotted lines in Fig. 5. As this sidewise movement of the frame and the body thereon is due to the suspension of the spring on the depending links; it follows that by restricting the movement of the links to only such distance as is necessary to allow the springs to elongate and resisting movement of the links so that they will not swing freely, the side swaying will be prevented. This I accomplish by disposing a resilient body back of the links at each end of the spring, which in this case more particularly consists of a block of rubber of such resisting character as to prevent free swinging of the links and take up lost motion thereof, yet allow same to move backward on depression of the spring.

These bumpers serve to stabilize the vehicle body without destroying the cushioning action of its springs, and render it less hazardous to drive the vehicle around turns, over rough or laterally sloping surfaces, and at the same time enhance the riding qualities of the vehicle.

What I claim is:

1. The combination with a spring suspended at its ends on swinging links, of a yieldable body disposed at the ends of the springs and rearwardly of the links to oppose and restrict their swinging movement.

2. The combination with a spring suspended at its ends on swinging links of a resilient block disposed at the ends of the springs and at a place to yieldably oppose and restrict the swinging movement of the links and take up lost motion thereof.

3. The combination with a spring, an axle, a pair of brackets on the latter, and links depending from said brackets, on which the terminals of the spring are supported, of a resilient block seated on the axle and interposed between the links and brackets to yieldably oppose rearward movement of the links.

4. A bumper adapted to be disposed between the axle, bracket, links, and spring terminal of a vehicle comprising a resilient body, seated on the axle and having a transverse arcuate channel to receive the spring terminal.

5. A bumper adapted to be disposed between the axle, bracket, links, and spring terminal of a vehicle, comprising a resilient body, seated on the axle and having a transverse arcuate channel to receive the spring terminal, and formed with ears adapted to extend on opposite sides of the bracket.

6. A bumper adapted to be disposed between the axle, bracket, links, and spring terminal of a vehicle, comprising a resilient body, seated on the axle and having a transverse arcuate channel to receive the spring terminal, and a spring clamp adapted to extend over the bracket into engagement with the resilient body.

7. The combination with a spring, an axle, a pair of brackets on the latter, and links depending from said brackets, from which the terminals of the spring are suspended, of a resilient block, seated on the axle, and interposed between the links and brackets to yieldably oppose rearward movement of the links, and a spring clamp adapted to extend over the bracket into detachable engagement with the block.

In testimony whereof I have signed my name to this specification.

HENRY T. HAZARD.

Copies of this patent may be obtained for five cents each, by addressing the "Commissioner of Patents, Washington, D. C."